US010034204B2

(12) United States Patent
Wheelock

(10) Patent No.: US 10,034,204 B2
(45) Date of Patent: Jul. 24, 2018

(54) VIRTUAL OVERLAY NETWORK FOR ROUTING WIRELESS COMMUNICATIONS

(71) Applicant: ARRIS Enterprises LLC, Suwanee, GA (US)

(72) Inventor: Ian G. Wheelock, Blackrock (IE)

(73) Assignee: ARRIS Enterprises LLC, Suwanee, GA (US)

(*) Notice: Subject to any disclaimer, the term of this patent is extended or adjusted under 35 U.S.C. 154(b) by 188 days.

(21) Appl. No.: 15/053,579

(22) Filed: Feb. 25, 2016

(65) Prior Publication Data

US 2017/0251413 A1    Aug. 31, 2017

(51) Int. Cl.
*H04W 36/00* (2009.01)
*H04W 36/30* (2009.01)

(52) U.S. Cl.
CPC ........ *H04W 36/0033* (2013.01); *H04W 36/30* (2013.01)

(58) Field of Classification Search
CPC . H04W 36/0083; H04W 36/08; H04W 36/30; H04W 76/02
See application file for complete search history.

(56) References Cited

U.S. PATENT DOCUMENTS

| 5,889,769 | A | * | 3/1999 | Mizuno | H04W 28/26 370/310.2 |
| 9,014,141 | B2 | * | 4/2015 | Kim | H04L 5/001 370/331 |
| 9,253,704 | B1 | * | 2/2016 | Sarkar | H04W 36/30 |
| 9,705,803 | B1 | * | 7/2017 | Oroskar | H04L 47/14 |
| 2006/0133318 | A1 | * | 6/2006 | Jung | H04W 36/30 370/331 |
| 2016/0157281 | A1 | * | 6/2016 | Syed | H04W 76/023 370/329 |
| 2016/0192261 | A1 | * | 6/2016 | Wang | H04W 36/0055 370/331 |
| 2016/0373984 | A1 | * | 12/2016 | Hara | H04W 36/0083 |
| 2017/0006504 | A1 | * | 1/2017 | Townend | H04W 28/22 |

* cited by examiner

*Primary Examiner* — Hashim Bhatti
(74) *Attorney, Agent, or Firm* — Bart A. Perkins

(57) ABSTRACT

Methods, systems and computer readable media can be operable to facilitate the configuration of a foreign access point to route communications between a client device and network. In embodiments, when a client device communicating with a first access point within a local subscriber premise receives a radio signal from a second access point situated within a remote subscriber premise that is stronger than the radio signal received by the client device from the first access point, the client device can cause configuration information associated with the first access point to be delivered to the second access point. The second access point may serve as a proxy for the first access point by routing communications to and from the client device.

17 Claims, 6 Drawing Sheets

VIRTUAL OVERLAY NETWORK FOR ROUTING WIRELESS COMMUNICATIONS

TECHNICAL FIELD

This disclosure relates to an overlay network for routing wireless communications.

BACKGROUND

Typically multiple services including data, video and/or voice services are controlled at a subscriber premise through a central device such as a gateway device, modem, or any other device configured to route communications between a network and one or more client devices. Communications received at a central device may be routed and transmitted to one or more targeted client devices over a wired or a wireless network. A central device may provide a wireless network by serving as an access point for one or more client devices, and may identify itself to client devices by transmitting a radio signal.

When communications are received by a client device over a wireless network provided by a central device, the quality of the communications as they are received by the client device may become dependent on the strength of the wireless connection between the client device and central device. For example, the quality of the communications as received by a client device may depend on the strength of a radio signal transmitted from the central device and received by the client device. As the received signal becomes weaker at the client device, the bitrate at which communications may be delivered to the client device from the central device will decrease, and the communications may be degraded or signal strength may reach a point at which the client device is no longer able to receive communications from the central device.

The strength of a radio signal received at a client device may be dependent upon various factors including, but not limited to, the distance between the client device and radio transmitter (e.g., transmitter of central device), the strength of the radio transmitter, barriers in between the client device and radio transmitter, material of the barriers between the client device and radio transmitter, and other factors. Because of the various factors that may affect radio signal strength, the strength of a signal received by a client device from a central device may vary significantly as the client device is moved throughout a subscriber premise. In some instances, barriers between certain areas of a subscriber premise and a central device may lead to the certain areas becoming dead-zones or areas that receive a weak radio signal from the central device or do not receive the signal from the central device at all.

At some areas within a subscriber premise, a client device may receive and recognize a radio signal transmitted from a central device or access point that is situated outside of the subscriber premise, and the signal received by the client device from the outside central device or access point may be stronger than the signal received by the client device from a central device or access point that is situated within the subscriber premise. For example, a multiple dwelling unit (MDU) may have multiple subscriber premises situated within close proximity of each other. Certain areas of a subscriber premise within a MDU may receive a stronger signal from a central device or access point that is within an adjacent or neighboring subscriber premise than the signal received by the area from a central device or access point that is within the subscriber premise. However, the client device will typically be precluded from accessing a central device or access point that is associated with a neighboring subscriber premise. Therefore, it is desirable to improve upon methods and systems for providing the best wireless signal available to a client device as the client device is moved throughout a subscriber premise.

BRIEF DESCRIPTION OF THE DRAWINGS

Like reference numbers and designations in the various drawings indicate like elements.

DETAILED DESCRIPTION

Figure 1:
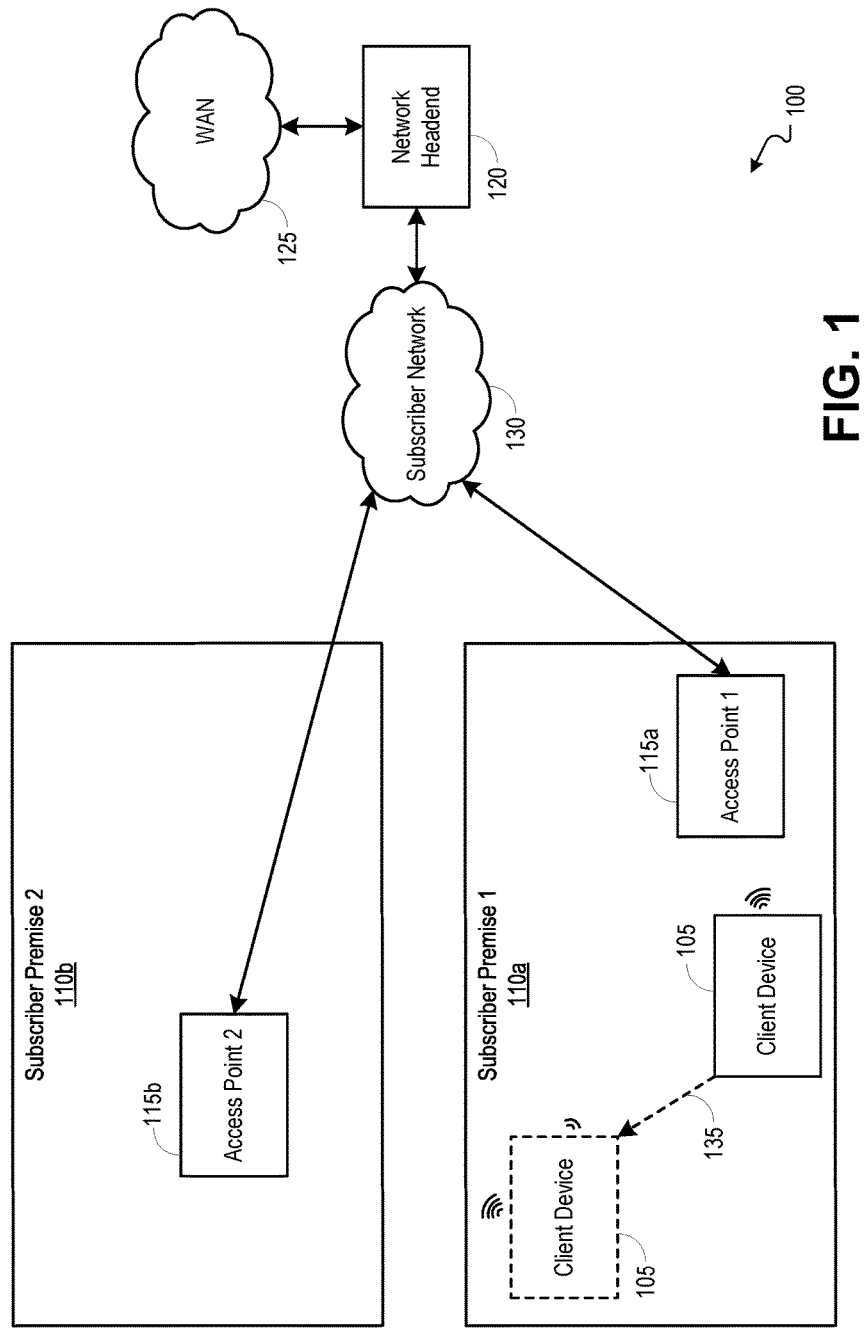
FIG. 1 is a block diagram illustrating an example network environment operable to facilitate the configuration of an access point to route traffic as a proxy for a foreign service set.

It is desirable to improve upon methods and systems for providing the best wireless connection possible to a client device as the device is moved throughout a subscriber premise. Methods, systems and computer readable media described herein facilitate the configuration of a foreign access point to route communications between a client device and network. In embodiments, when a client device communicating with a first access point within a local subscriber premise receives a radio signal from a second access point situated within a remote subscriber premise that is stronger than the radio signal received by the client device from the first access point, the client device can cause configuration information associated with the first access point to be delivered to the second access point. The second access point may serve as a proxy for the first access point by routing communications to and from the client device.

An embodiment of the invention described herein may include a method comprising: (a) receiving, at a client device, one or more services from a first access point, wherein the first access point is located within a first subscriber premise; (b) determining that a quality level associated with delivery of the one or more services from the first access point is below a predetermined threshold level; (c) identifying a second access point, wherein the second access point is located within a second subscriber premise; (d) delivering configuration parameters associated with the first access point to the second access point; and (e) establishing an association between the client device and the second access point.

According to an embodiment of the invention, the quality level associated with delivery of the one or more services from the first access point comprises a strength of a wireless signal carrying communications between the client device and the first access point.

According to an embodiment of the invention, establishing the association between the client device and the second access point comprises configuring the second access point to receive and forward upstream communications from the client device to an upstream network element and to receive and forward downstream communications from the upstream network element to the client device.

According to an embodiment of the invention, the second access point adds a unique identifier to an upstream communication, the unique identifier serving to identify the first access point.

According to an embodiment of the invention, the second access point forwards downstream communications to the client device according to one or more configuration parameters associated with the first access point.

According to an embodiment of the invention, the second access point receives upstream communications from the client device and outputs downstream communications to the client device over an unencrypted wireless network.

According to an embodiment of the invention, the configuration information associated with the first access point is retrieved by the client device from the first access point and is output from the client device to the second access point.

According to an embodiment of the invention, the configuration information associated with the first access point is output from the first access point to the second access point.

An embodiment of the invention described herein may include an access point that is configured to operate as a proxy access point for a client device when one or more services provided to the client device by a primary access point degrade past a predetermined threshold, wherein the primary access point is located in a first subscriber premise and the proxy access point is located in a second subscriber premise, the proxy access point comprising: (a) one or more interfaces configured to be used to receive configuration information associated with the primary access point; and (b) one or more modules configured to: (i) establish an association with the client device; (ii) repackage an upstream communication received from the client device such that a unique identifier associated with the primary access point is included within the upstream communication; (iii) output the repackaged upstream communication to an upstream network element; (iv) receive a response to the repackaged upstream communication; and (v) output the response to the client device.

An embodiment of the invention described herein may include one or more non-transitory computer readable media having instructions operable to cause one or more processors to perform the operations comprising: (a) receiving, at a client device, one or more services from a first access point, wherein the first access point is located within a first subscriber premise; (b) determining that a quality level associated with delivery of the one or more services from the first access point is below a predetermined threshold level; (c) identifying a second access point, wherein the second access point is located within a second subscriber premise; (d) delivering configuration parameters associated with the first access point to the second access point; and (e) establishing an association between the client device and the second access point.

FIG. 1 is a block diagram illustrating an example network environment 100 operable to facilitate the configuration of an access point to route traffic as a proxy for a foreign service set. In embodiments, video, voice, and/or data services may be delivered to one or more client devices 105 over one or more data paths. Client devices 105 may include a television, mobile device, tablet, computer, set-top box (STB), telephone, gaming device, and any other device operable to receive video, voice, and/or data services.

In embodiments, communications associated with the multiple services provided to a subscriber may be received at a subscriber premise (e.g., subscriber premises 110a-b) by an access point (e.g., access points 115a-b). An access point 115a-b may include any device configured to facilitate the delivery of communications between an upstream network or network element (e.g., network headend 120) and one or more client devices. For example, an access point 115a-b may include a gateway, modem, router, wireless extender, or other access device. An access point 115a-b may be integrated with other devices. For example, an access point 115a-b may reside within a gateway device, set-top box, or other device.

An access point may route received communications to a targeted client device 105 over a local network. The local network may include a local area network (LAN), wireless local area network (WLAN), personal area network (PAN), Multimedia over Coax Alliance (MoCA) network, mobile hotspot network, and others. It should be understood that the local network may include a combination of networks and transmission mediums. It will be appreciated by those skilled in the relevant art that delivery of the multiple services over the local network may be accomplished using a variety of standards and formats.

In embodiments, multiple services (e.g., video, voice, and/or data services) may be delivered from a wide-area network (WAN) 125 to the local network 110 through a connection to a subscriber network 130. The subscriber network 130 may include an optical network, hybrid fiber coaxial (HFC) network, digital subscriber line (DSL) network, twisted-pair, mobile network, high-speed data network, and any other network configured to transport signals over multiple channels. It should be understood that the multiple services may be provided to multiple subscriber premises (e.g., subscriber premises 110a-b) though one or more subscriber networks 130. Communications may be routed between a WAN 125 and one or more subscriber networks 130 by a network headend 120.

It will be appreciated by those skilled in the relevant art that client devices 105 may be capable of interacting and communicating with each other and/or with an access point 115a-b over various wireless communication standards (e.g., Wi-Fi, Bluetooth, etc.). An access point 115a-b may provide a wireless network through which to deliver services to one or more client devices 105 and to receive communications from one or more client devices 105. For example, the access point may act as both a transmitter and a receiver of radio signals to be used to carry communications between the access point and one or more client devices 105. The access point and one or more client devices 105 associated with the access point may be referred to as a service set.

In embodiments, the strength of an access point radio signal as received by a client device 105 may affect the bitrate at which communications are received by the client device and/or output from the client device. For example, as the strength of an access point radio signal weakens at a client device, the bitrate at which the client device may receive or output signals decreases. The strength of an access point radio signal as received by a client device 105 may be dependent upon various factors including, but not limited to the distance between the client device 105 and access point, barriers between the client device 105 and access point (e.g., walls, doors, floors, etc.), material of the barriers between the client device 105 and access point, strength of transmit signal at the access point, and others. For example, as the client device 105 moves away from access point 1 (e.g., transition 135), the wireless radio signal received by the client device 105 from access point 1 becomes weaker.

In embodiments, a client device 105 may receive and recognize wireless radio signals from access points that are located outside of a subscriber premise associated with the client device 105. For example, a client device 105 within a first subscriber premise (e.g., subscriber premise 1) may receive and recognize a wireless radio signal from an access point 2 that is located within a second subscriber premise (e.g., subscriber premise 2). Each access point 115*a-b* may provide a secure wireless network for use by each client device 105 that is associated with each respective access point. For example, an access point 115*a-b* may provide a secure wireless network to each client device 105 within an associated subscriber premise 110*a-b*. A client device 105 may recognize an associated service set or wireless network provided by an access point 115*a-b* through a unique service set identifier (SSID). Once recognized, a client device 105 may associate with an access point 115*a-b* by communicating a unique key or password to the access point. When a client device 105 is associated with an access point 115*a-b*, the access point 115*a-b* may package and output communications received from the client device 105 and output communications to the client device 105. Various configuration parameters may be established for the association between the client device 105 and access point 115*a-b*. For example, an access point 115*a-b* may deliver certain services associated with the client device 105 and/or may treat communications output to and received from a client device 105 with a certain quality of service (QoS) level.

In embodiments, a client device 105 may be configured to measure the strength of a radio signal received from an access point 115. When the strength of a radio signal received from an access point 115 drops below a certain level at a client device 105 (e.g., the signal strength weakens to the point that a service received by the client device 105 degrades or becomes unavailable due to loss of bitrate, bitrate falls below a level corresponding with a certain quality of service (QoS) associated with the client device or service, etc.), the client device 105 may check the signal strength(s) of one or more other access points 115 available to the client device 105, and if a different access point has a stronger signal than the signal of the access point through which the client device is currently communicating, the client device 105 can start communicating with the other access point. For example, as the client device 105 moves away from a first access point (e.g., access point 115*a*) and closer to a second access point (e.g., access point 115*b*) during transition 135, the strength of the signal received from the first access point will weaken as the strength of the signal received from the second access point will strengthen. When the strength of the radio signal received from the first access point drops below a certain level, the client device 105 may attempt to communicate with the second access point.

In embodiments, a client device 105 may be configured to periodically identify and measure the strengths of wireless radio signals available to the client device 105 from one or more access points 115*a-b*. The client device 105 may compare the strengths of signals received from each of the one or more access points 115*a-b*, and when the strength of a signal received from an access point becomes greater than the strength of the signal received from the access point through which the client device 105 is currently communicating, the client device 105 can start communicating with the other access point. For example, as the client device 105 moves away from a first access point (e.g., access point 115*a*) and closer to a second access point (e.g., access point 115*b*) during transition 135, the strength of the signal received from the first access point will weaken as the strength of the signal received from the second access point will strengthen. When the strength of the signal received from the second access point becomes greater than the strength of the signal received from the first access point, the client device 105 may attempt to communicate with the second access point.

When a client device 105 makes the determination to associate with a second access point (e.g., access point 115*b*), the client device 105 may retrieve configuration information associated with the access point with which the client device 105 is currently associated with (e.g., access point 115*a*) and may forward the configuration information to the second access point. In embodiments, the client device 105 may output a message to the second access point, wherein the message communicates the client device 105 intention of associating with the second access point and identifies the access point with which the client device 105 is currently associated. The second access point may then retrieve configuration information from the first access point. In embodiments, the client device 105 may output a message to the first access point, wherein the message communicates the client device 105 intention of associating with the second access point and identifies the second access point. The first access point may then output configuration information to the second access point. It should be understood that configuration information received by the second access point may include an SSID, QoS settings, and any other information associated with the first access point.

When a client device 105 associates with the second access point (e.g., access point 115*b*), the client device 105 may pass upstream communications (e.g., communications to be output to an upstream network element such as a network headend 120) to the second access point and the second access point may forward the upstream communications to an upstream network element. The second access point may package an upstream communication received from the client device 105 such that an upstream network element recognizes the communication as originating from the primary access point that is associated with the client device 105 (e.g., access point 115*a*). For example, the second access point may add a tag or header to the upstream communication, wherein the tag or header provides a unique identifier associated with the first access point.

When the client device 105 is associated with the second access point (e.g., access point 115*b*), downstream communications targeted for the client device 105 may be delivered to the second access point and routed from the second access point to the client device 105. The second access point may output a communication to an upstream network element or server (e.g., network headend 120), wherein the communication notifies the upstream network element or server that the communications targeted at the client device 105 are to be delivered to the second access point. For example, the communication may be delivered to the upstream network element or server within an upstream communication that is routed from the client device 105 to the upstream network element or server through the second access point. In embodiments, the second access point may modify the return path for communications targeted at the client device 105 such that communications targeted at the client device 105 are delivered to the second access point. For example, an upstream server generating a response to an upstream communication may output the response to the device (i.e., second access point) associated with a unique identifier included within the upstream communication.

In embodiments, the second access point (e.g., access point 115b) may use resources allocated to a guest or home hotspot network (e.g., a network that is unencrypted and thus accessible to a device without requiring the input of a password) to support communications between the client device 105 and an upstream network or network element. The second access point may prioritize client devices accessing the second access point such that communications are delivered to client devices within the subscriber premise associated with the second access point (e.g., subscriber premise 110b) before or at the expense of the delivery of communications to client devices within a different subscriber premise (e.g., client device 105 within subscriber premise 110a). For example, if the second access point does not have enough available bandwidth to deliver communications to the client device 105, the second access point can delay the output of communications to the client device 105 or may cause the first access point to resume the delivery of communications to the client device 105. It should be understood that software-defined networking (SDN) and/or remote monitoring and management (RRM) software may be used to configure an access point as a proxy access point and to route traffic between a client device and upstream network element through a designated proxy access point.

Figure 2:
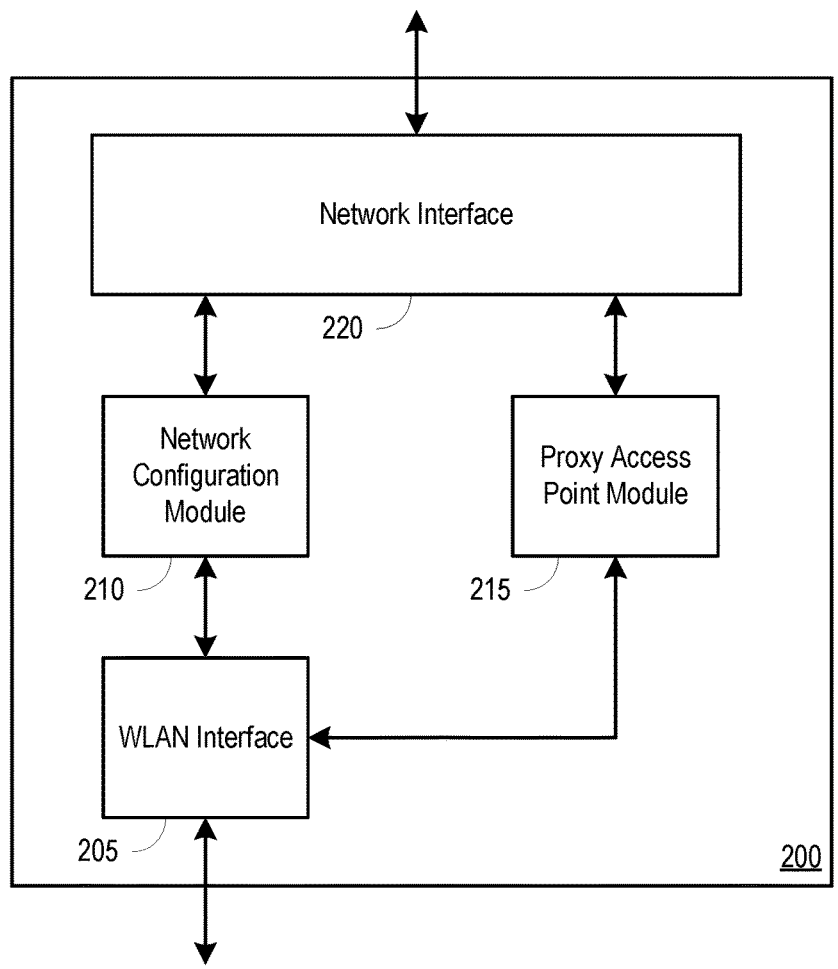
FIG. 2 is a block diagram illustrating an example central device operable to facilitate a configuration of the central device to associate with a remote client device.

FIG. 2 is a block diagram illustrating an example central device 200 operable to facilitate configuration of the central device to associate with a remote client device. The central device 200 may include a WLAN interface 205, a network configuration module 210, a proxy access point module 215, and a network interface 220. In embodiments, the central device 200 (e.g., access point 115a of FIG. 1 or access point 115b of FIG. 1) may be any device configured to route communications between one or more client devices (e.g., client device 105 of FIG. 1) and an upstream network.

In embodiments, when the strength of a radio signal carrying communications between a client device 105 and a central device 200 drops below a certain level (e.g., the signal strength weakens to the point that a service received by the client device 105 degrades or becomes unavailable due to loss of bitrate, bitrate falls below a level corresponding with a certain quality of service (QoS) associated with the client device or service, etc.), the client device 105 may check the signal strength(s) of one or more other access points available to the client device 105, and if a different access point has a stronger signal than the signal of the access point through which the client device is currently communicating, the client device 105 can start communicating with the other access point. A client device 105 may be configured to periodically identify and measure the strengths of wireless radio signals available to the client device 105 from one or more access points 115a-b. The client device 105 may compare the strengths of signals received from each of the one or more access points 115a-b, and when the strength of a signal received from an access point becomes greater than the strength of the signal received from the access point through which the client device 105 is currently communicating, the client device 105 can start communicating with the other access point.

When a client device 105 makes the determination to associate with a second access point, the client device 105 may retrieve configuration information associated with the access point with which the client device 105 is currently associated with (e.g., through a WLAN interface 205) and may forward the configuration information to the second access point. The client device 105 may transmit and the second access point may receive the configuration information associated with the other access point through a WLAN interface 205 of the second access point. The second access point may receive a communication from the client device 105, wherein the communication includes a request by the client device 105 to associate with the second access point and an identification of the access point with which the client device 105 is currently associated. In embodiments, configuration information (e.g., SSID, password, frequency band, QoS settings, etc.) associated with the first access point may be output from the first access point to the second access point via one or more wireless communications that are received by the second access point through the WLAN interface 205. For example, a network configuration module 210 of the first access point may compile configuration information and generate the one or more communications including the configuration information.

When a client device 105 associates with the second access point, the second access point may receive upstream communications (e.g., communications to be output to an upstream network element such as a network headend 120 of FIG. 1) through the WLAN interface 205, and the second access point may forward the upstream communications to an upstream network element through the network interface 220. In embodiments, a proxy access point module 215 may package an upstream communication received from the client device 105 such that an upstream network element recognizes the communication as originating from the primary access point that is associated with the client device 105 (e.g., the first access point). For example, the proxy access point module 215 may add a tag or header to the upstream communication, wherein the tag or header provides a unique identifier associated with the first access point.

In embodiments, when the access point is configured as a second access point for a client device 105, downstream communications targeted for the client device 105 may be received at the second access point (e.g., through the network interface 220) and may be routed through the proxy access point module 215 for delivery to the client device 105. The proxy access point module 215 may output a communication to an upstream network element or server (e.g., network headend 120), wherein the communication notifies the upstream network element or server that the communications targeted at the client device 105 are to be delivered to the second access point. For example, the communication may be delivered to the upstream network element or server within an upstream communication that is routed from the client device 105 to the upstream network element or server through the second access point. In embodiments, the proxy access point module 215 may modify the return path for communications targeted at the client device 105 such that communications targeted at the client device 105 are delivered to the second access point.

In embodiments, the proxy access point module 215 may use resources allocated to a guest or home hotspot network to support communications between the client device 105 and an upstream network or network element. The second access point may prioritize client devices accessing the second access point such that communications are delivered to client devices within the subscriber premise associated with the second access point before or at the expense of the delivery of communications to client devices within a different subscriber premise. For example, if the second access point does not have enough available bandwidth to deliver communications to the client device 105, the second access point can delay the output of communications to the client device 105 or may cause the first access point to resume the delivery of communications to the client device 105.

Figure 3:
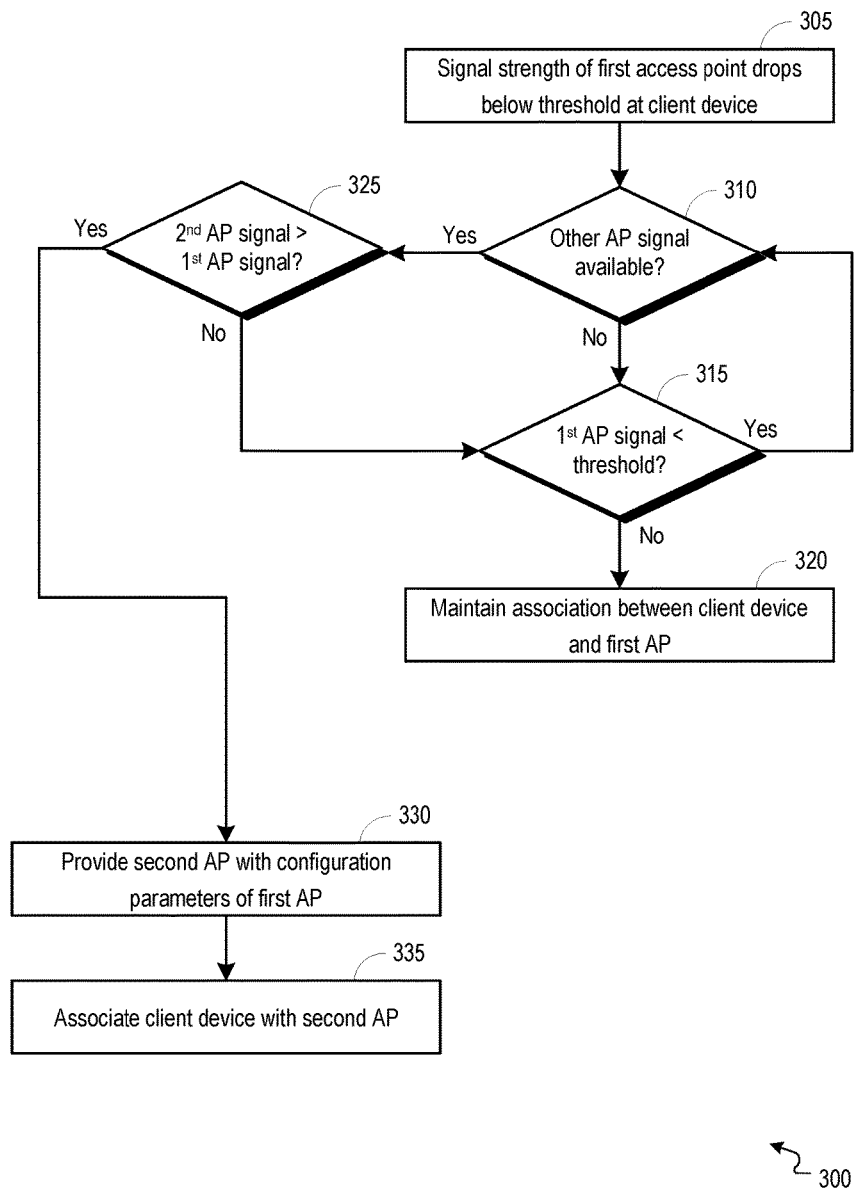
FIG. 3 is a flowchart illustrating an example process operable to facilitate the configuration of a foreign access point to route communications between a client device and network.

FIG. 3 is a flowchart illustrating an example process 300 operable to facilitate the configuration of a foreign access point to route communications between a client device and network. The process 300 can begin at 305, when a determination is made that the signal strength of a first access point as received by a client device drops below a threshold level. In embodiments, the strength of an access point radio signal as received by a client device may affect the bitrate at which communications are received by the client device and/or output from the client device. For example, as the strength of an access point radio signal weakens at a client device, the bitrate at which the client device may receive or output signals decreases. A client device 105 of FIG. 1 may be configured to measure the strength of a radio signal received from the first access point (e.g., access point 115a of FIG. 1), and the client device 105 can recognize when the signal strength drops below a threshold. The threshold may vary according to various factors such as the type of service being delivered to the client device 105, a QoS associated with the client device 105 or service delivered to the client device 105, and others. The threshold may be based on the bitrate supported by the signal strength of the first access point. For example, when the signal strength of the first access point as received by the client device 105 weakens to the point that one or more services received by the client device 105 are affected by the lower bitrate available to the client device 105, the determination may be made that the signal strength of the first access point has dropped below a threshold. It should be understood that signal strength may be measured according to a received signal strength indication (RSSI).

At 310, the determination is made whether one or more other access point signals are available to the client device. In embodiments, a radio receiver at the client device can identify radio signals being transmitted from one or more other access points. For example, if the client device 105 is within range of one or more other access points, the client device 105 may identify a radio signal being transmitted from the one or more other access points. A radio signal identified by a client device 105 may be transmitted from an access point that is within a neighboring subscriber premise (e.g., access point 115b of subscriber premise 110b in FIG. 1).

If, at 310, the determination is made that there are no other access point signals available to the client device, the process 300 can proceed to 315. At 315, the determination is made whether the signal strength of the first access point as received by the client device remains below the threshold. The client device 105 may measure the strength of the signal received from the first access point and determine whether the signal strength is below a threshold level. If the determination is made that the signal strength remains below a threshold level, the client device 105 can check whether one or more other access point signals are available to the client device 105 at 310.

If, at 315, the determination is made that the strength of the signal received from the first access point is greater than a threshold level, the process 300 can proceed to 320. At 320, the association between the client device and first access point may be maintained. For example, if the signal strength associated with the first access point (e.g., access point 115a) improves to a point where the quality of the services received by the client device 105 are no longer limited by the signal strength, the client device 105 may continue communicating through the first access point.

Returning to 310, if the determination is made that one or more other access point signals are available to the client device, the process 300 can proceed to 325. At 325, the determination is made whether one or more of the other access point signals are stronger than the first access point signal. The client device 105 may compare signal strengths of the one or more other access points and the first access point. If there are no other access point signals that are stronger than the first access point signal, the process 300 can proceed to 315.

If, at 325, the determination is made that one or more other access point signals are stronger than the first access point signal, the process 300 can proceed to 330. At 330, configuration parameters associated with the first access point may be provided to a second access point. The second access point may be an access point located within a neighboring subscriber premise and may be the access point from the one or more other access points having the highest signal strength as received by the client device. In embodiments, the client device may retrieve configuration information associated with the first access point from the first access point and output the configuration information to the second access point. In embodiments, the client device can instruct the first access point to output configuration information to the second access point. Configuration information may include an SSID and associated parameters, QoS settings, and other information that may be used to allow client device communications to be routed through the second access point.

At 335, the client device may be associated with the second access point. In embodiments, the client device may retrieve credentials associated with the second access point (e.g., SSID, frequency band, password, etc.) and establish a communication path with the second access point such that communications may be passed between the client device and the second access point. When the client device 105 is associated with the second access point (e.g., access point 115b of FIG. 1), the client device 105 may output upstream communications to the second access point and the second access point may forward the received communications upstream. The second access point may package or wrap the received communications to give the communications the appearance that they originated at the first access point. In embodiments, while the client device 105 is associated with the second access point, downstream communications targeted at the client device 105 may be delivered to the second access point and the second access point can route the downstream communications to the client device 105.

Figure 4:
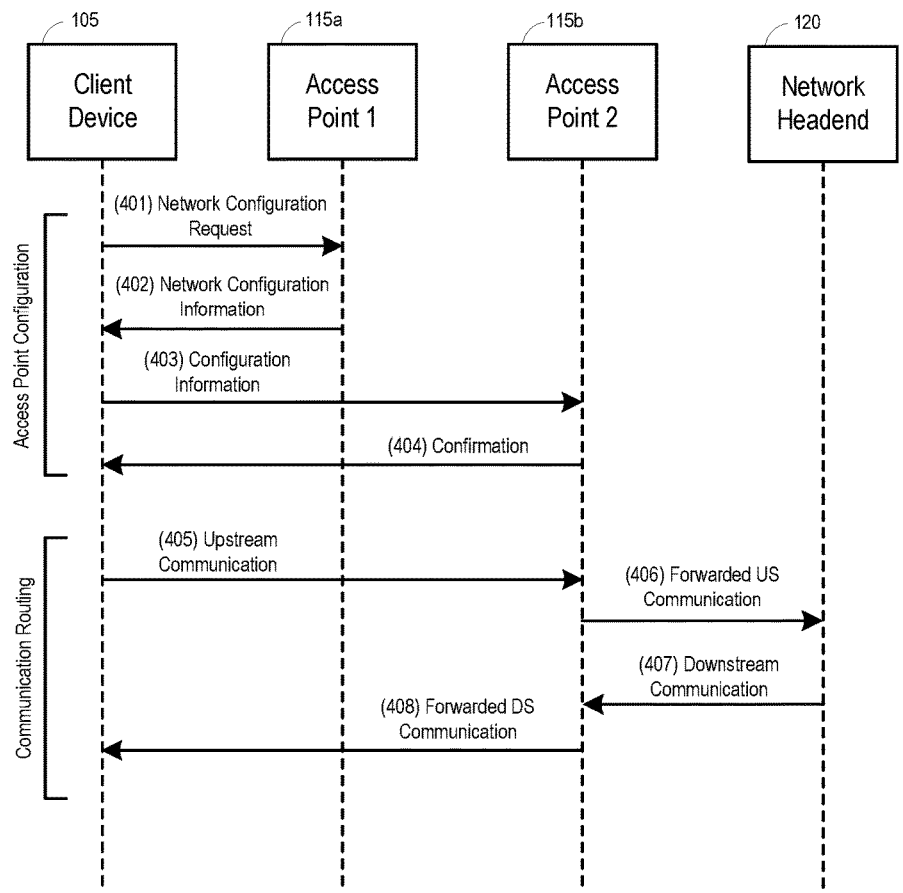
FIG. 4 shows an example sequence diagram of an embodiment wherein a second access point is configured to route communications to and from a client device that is associated with a first access point.

FIG. 4 shows an example sequence diagram of an embodiment wherein a second access point is configured to route communications to and from a client device that is associated with a first access point. A client device 105 may initiate the configuration of a second access point when the determination is made that the radio signal received from the second access point is stronger than the radio signal received from the first access point. At 401, the client device 105 may output a network configuration request to a first access point (e.g., access point 115*a*). In response to the network configuration request, the first access point may output network configuration information to the client device 105 at 402. The network configuration information may include an SSID and associated parameters, QoS settings, and other information that may be used to allow client device communications to be routed through a second access point. The network configuration request and network configuration information may be communicated between the client device 105 and first access point as wireless communications (e.g., Wi-Fi communications) over a WLAN provided by the first access point.

At 403, configuration information associated with the first access point may be output from the client device 105 to a second access point (e.g., access point 115*b*). The second access point 115*b* may store the configuration information associated with the first access point for use when treating and routing communications to and from the client device 105. At 404, the second access point may output a confirmation to the client device 105 to inform the client device 105 that it may begin outputting upstream communications to the second access point and that the client device 105 may receive downstream communications from the second access point.

At 405, the client device 105 may output an upstream communication to the second access point, and the second access point may forward the upstream communication to a network headend 120 at 406. In embodiments, the second access point may package or wrap the upstream communication such that the forwarded upstream communication includes information identifying the first access point. The forwarded upstream communication may include a request that downstream communications targeted at the client device 105 be delivered to the second access point from the network headend 120.

At 407, a downstream communication targeted at the client device 105 may be output from a network headend 120 to the second access point. The second access point can forward the downstream communication to the client device 105. The upstream communication and forwarded downstream communication may be communicated between the client device 105 and second access point as wireless communications (e.g., Wi-Fi communications) over a WLAN provided by the second access point.

Figure 5:
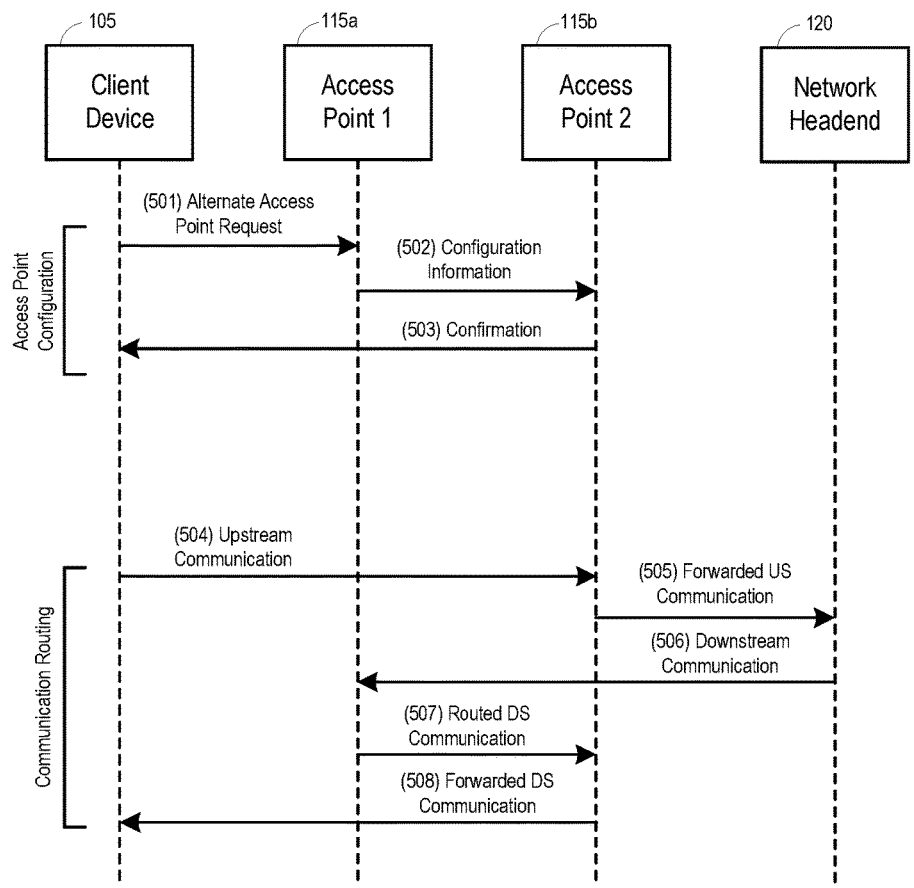
FIG. 5 shows an example sequence diagram of an alternative embodiment wherein a second access point is configured to route communications to and from a client device that is associated with a first access point.

FIG. 5 shows an example sequence diagram of an alternative embodiment wherein a second access point is configured to route communications to and from a client device that is associated with a first access point. A client device 105 may initiate the configuration of a second access point when the determination is made that the radio signal received from the second access point is stronger than the radio signal received from the first access point. At 501, the client device 105 may output an alternate access point request to a first access point (e.g., access point 115*a*), wherein the first access point is an access point with which the client device 105 is currently associated. The alternate access point request may identify the second access point (e.g., access point 115*b*). It should be understood that identification of the second access point may be made using various identifiers (e.g., IP address, subnet address, MAC address, etc.).

In response to the alternate access point request, the first access point may output configuration information associated with the first access point to the second access point at 502. The configuration information may include an SSID and associated parameters, QoS settings, and other information that may be used to allow client device communications to be routed through a second access point. The second access point 115*b* may store the configuration information associated with the first access point for use when treating and routing communications to and from the client device 105.

At 503, the second access point may output a confirmation to the client device 105 to inform the client device 105 that it may begin outputting upstream communications to the second access point and that the client device 105 may receive downstream communications from the second access point. The communications between the client device 105, first access point, and second access point may be communicated between the devices as wireless communications (e.g., Wi-Fi communications) over one or more WLANs provided by the first access point and/or second access point.

At 504, the client device 105 may output an upstream communication to the second access point, and the second access point may forward the upstream communication to a network headend 120 at 505. In embodiments, the second access point may package or wrap the upstream communication such that the forwarded upstream communication includes information identifying the first access point. The forwarded upstream communication may include a request that downstream communications targeted at the client device 105 continue to be delivered to the first access point from the network headend 120.

At 506, a downstream communication targeted at the client device 105 may be output from a network headend 120 to the first access point. The first access point may route the downstream communication to the second access point at 507, and the second access point can forward the downstream communication to the client device 105 at 508. The upstream communication and downstream communications may be communicated between the client device 105, first access point, and second access point as wireless communications (e.g., Wi-Fi communications) over one or more WLANs provided by the first access point and/or second access point.

Figure 6:
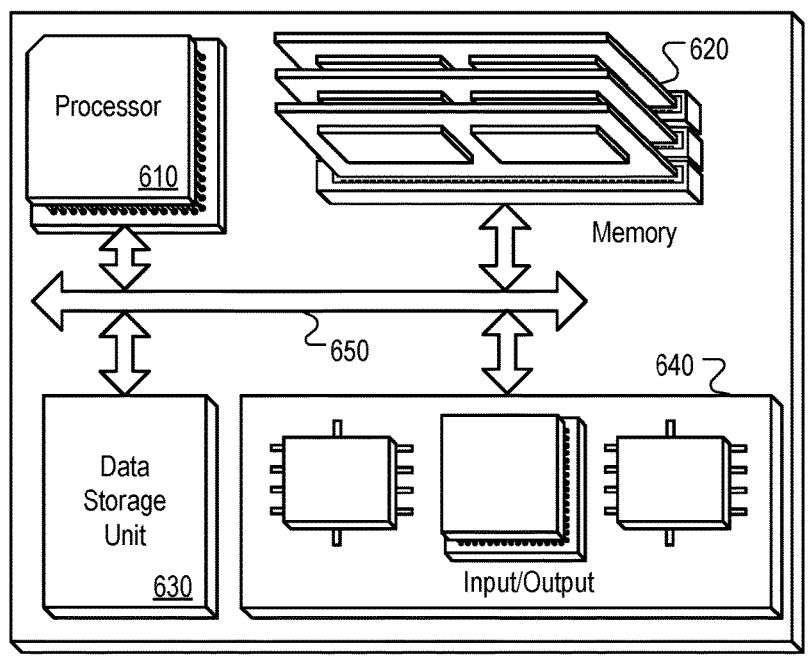
FIG. 6 is a block diagram of a hardware configuration operable to facilitate the configuration of a foreign access point to route communications between a client device and network.

FIG. 6 is a block diagram of a hardware configuration 600 operable to facilitate the configuration of a foreign access point to route communications between a client device and network. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting communications to a client device 105 of FIG. 1 (e.g., television, STB, computer, mobile device, tablet, etc.) or access point 115*a-b* of FIG. 1. In another implementation, the input/output device can include driver devices configured to send communications to, and receive communications from one or more networks (e.g., local network such as a WLAN, subscriber network 130 of FIG. 1, WAN 125 of FIG. 1, etc.).

Those skilled in the art will appreciate that the invention improves upon methods and systems for providing the best wireless connection possible to a client device as the device is moved throughout a subscriber premise. Methods, systems and computer readable media described herein facilitate the configuration of a foreign access point to route communications between a client device and network. In embodiments, when a client device communicating with a first access point within a local subscriber premise receives a radio signal from a second access point situated within a remote subscriber premise that is stronger than the radio signal received by the client device from the first access point, the client device can cause configuration information associated with the first access point to be delivered to the second access point. The second access point may serve as a proxy for the first access point by routing communications to and from the client device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving, at a client device, one or more services from a first access point, wherein the first access point is located within a first subscriber premise;
   determining that a quality level associated with delivery of the one or more services from the first access point is below a predetermined threshold level;
   identifying a second access point, wherein the second access point is located within a second subscriber premise;
   delivering configuration parameters associated with the first access point to the second access point; and
   establishing an association between the client device and the second access point, wherein establishing the association between the client device and the second access point comprises configuring the second access point to receive and forward upstream communications from the client device to an upstream network element and to receive and forward downstream communications from the upstream network element to the client device, wherein the second access point adds a unique identifier to an upstream communication, the unique identifier serving to identify the first access point.

2. The method of claim 1, wherein the quality level associated with delivery of the one or more services from the first access point comprises a strength of a wireless signal carrying communications between the client device and the first access point.

3. The method of claim 1, wherein the second access point forwards downstream communications to the client device according to one or more configuration parameters associated with the first access point.

4. The method of claim 1, wherein the second access point receives upstream communications from the client device and outputs downstream communications to the client device over an unencrypted wireless network.

5. The method of claim 1, wherein the configuration information associated with the first access point is retrieved by the client device from the first access point and is output from the client device to the second access point.

6. The method of claim 1, wherein the configuration information associated with the first access point is output from the first access point to the second access point.

7. An access point that is configured to operate as a proxy access point for a client device when one or more services provided to the client device by a primary access point degrade past a predetermined threshold, wherein the primary access point is located in a first subscriber premise and the proxy access point is located in a second subscriber premise, the proxy access point comprising:
   one or more interfaces configured to be used to receive configuration information associated with the primary access point; and
   one or more modules configured to:
     establish an association with the client device;
     repackage an upstream communication received from the client device such that a unique identifier associated with the primary access point is included within the upstream communication;
     output the repackaged upstream communication to an upstream network element;
     receive a response to the repackaged upstream communication; and
     output the response to the client device.

8. The proxy access point of claim 7, wherein the response is output to the client device according to one or more configuration parameters associated with the primary access point.

9. The proxy access point of claim 7, wherein the upstream communication is received from the client device and the response is output to the client device over an unencrypted wireless network.

10. The proxy access point of claim 7, wherein the configuration information associated with the primary access point is retrieved by the client device from the primary access point and is output from the client device to the proxy access point.

11. One or more non-transitory computer readable media having instructions operable to cause one or more processors to perform the operations comprising:
    receiving, at a client device, one or more services from a first access point, wherein the first access point is located within a first subscriber premise;
    determining that a quality level associated with delivery of the one or more services from the first access point is below a predetermined threshold level;
    identifying a second access point, wherein the second access point is located within a second subscriber premise;
    delivering configuration parameters associated with the first access point to the second access point, wherein the configuration parameters associated with the first access point are retrieved by the client device from the first access point and are output from the client device to the second access point; and
    establishing an association between the client device and the second access point.

12. The one or more non-transitory computer-readable media of claim 11, wherein the quality level associated with delivery of the one or more services from the first access point comprises a strength of a wireless signal carrying communications between the client device and the first access point.

13. The one or more non-transitory computer-readable media of claim 11, wherein establishing the association between the client device and the second access point comprises configuring the second access point to receive and forward upstream communications from the client device to an upstream network element and to receive and forward downstream communications from the upstream network element to the client device.

14. The one or more non-transitory computer-readable media of claim 13, wherein the second access point adds a unique identifier to an upstream communication, the unique identifier serving to identify the first access point.

15. The one or more non-transitory computer-readable media of claim 13, wherein the second access point forwards downstream communications to the client device according to one or more configuration parameters associated with the first access point.

16. The one or more non-transitory computer-readable media of claim 13, wherein the second access point receives upstream communications from the client device and outputs downstream communications to the client device over an unencrypted wireless network.

17. The one or more non-transitory computer-readable media of claim 11, wherein the configuration information associated with the first access point is output from the first access point to the second access point.

* * * * *